US007813735B2

(12) United States Patent
Monfet et al.

(10) Patent No.: US 7,813,735 B2
(45) Date of Patent: Oct. 12, 2010

(54) METHOD AND APPARATUS FOR PERFORMING A POWER EFFICIENT CELL SEARCH IN A MULTI-CELL WIRELESS COMMUNICATION SYSTEM

(75) Inventors: Frederic Monfet, Montreal (CA); Alpaslan Demir, East Meadow, NY (US); Mark L. Richards, Ottawa (CA)

(73) Assignee: InterDigital Technology Coporation, Wilmington, DE (US)

(*) Notice: Subject to any disclaimer, the term of this patent is extended or adjusted under 35 U.S.C. 154(b) by 677 days.

(21) Appl. No.: 11/688,286

(22) Filed: Mar. 20, 2007

(65) Prior Publication Data

US 2007/0291730 A1  Dec. 20, 2007

Related U.S. Application Data

(60) Provisional application No. 60/784,522, filed on Mar. 21, 2006.

(51) Int. Cl.
  H04W 4/00 (2009.01)
(52) U.S. Cl. .................. 455/443; 455/525; 455/449; 455/436; 370/331; 370/350; 375/325; 375/326
(58) Field of Classification Search .......... 455/525, 455/449; 370/350, 310, 345, 325–326
See application file for complete search history.

(56) References Cited

U.S. PATENT DOCUMENTS

| 2003/0039228 A1* | 2/2003 | Shiu et al. ............... 370/331 |
| 2003/0152167 A1* | 8/2003 | Oh et al. ................. 375/326 |
| 2007/0010280 A1* | 1/2007 | Zalio et al. .............. 455/525 |

FOREIGN PATENT DOCUMENTS

WO  2004/114539  12/2004

* cited by examiner

*Primary Examiner*—Nick Corsaro
*Assistant Examiner*—Sarwat Chughtai
(74) *Attorney, Agent, or Firm*—Volpe and Koenig, P.C.

(57) ABSTRACT

A method and apparatus for performing a power efficient cell search in a multi-cell wireless communication system are disclosed. A wireless transmit/receive unit (WTRU) having a memory that stores a cell identification list of prioritized previously top-ranked cell identities (IDs) is used to perform the cell search. A primary synchronization code (PSC) correlation peak location on a received signal is selected. A common pilot channel (CPICH) correlation value is determined by non-coherent integration of a local signal created based on a first cell ID on the cell identification list to the received signal. If the CPICH correlation value is greater than a noise threshold, thus indicating that the first cell ID is a newly found cell ID, or if a last cell ID in the cell identification list is reached, an additional determination is made as to whether there is more than one cell ID on the list having the same timing.

21 Claims, 3 Drawing Sheets

METHOD AND APPARATUS FOR PERFORMING A POWER EFFICIENT CELL SEARCH IN A MULTI-CELL WIRELESS COMMUNICATION SYSTEM

CROSS REFERENCE TO RELATED APPLICATION

This application claims the benefit of U.S. Provisional Application No. 60/784,522 filed Mar. 21, 2006, which is incorporated by reference as if fully set forth.

FIELD OF INVENTION

The present invention is related to a multi-cell wireless communication system. More specifically, the present invention relates implementing a Smart Cell Association Method (SCAM) to perform a cell search in the multi-cell wireless communication system.

BACKGROUND

During various connection modes of a wireless communication system, a cell search (CS) process must continuously monitor, (i.e., search for, identify and measure), cells that are part of a list of N cell identities (IDs), (e.g., existing networks employ a list having up to 32 cell IDs). In order to perform cell identification, the CS process attempts to associate primary synchronization code (PSC) correlation peak locations with a particularly listed cell ID, (i.e., one scrambling code per common pilot channel (CPICH)).

In a prior art approach, the CS process takes one PSC correlation peak at a time and use its associated timing information to correlate the received signal with one of the N scrambling codes in an exhaustive manner, (e.g., N=32 scrambling codes). All CPICH correlation values, obtained by accumulating the results of the correlation between the CPICH and the In-phase (I)/Quadrature (Q) baseband received signal, above a certain noise threshold are reported. The procedure exploits the fact that a Primary Synchronization Channel (P-SCH) and the CPICH have timing relationship. In a universal mobile telecommunications system (UMTS) downlink signaling structure, the P-SCH is repeated for the first 10% of each slot. There are 15 slots in each frame of 10 ms duration. The CPICH spans over a 10 ms frame, which is repeated on a per frame basis. The SCAM associates peak locations that are due to P-SCH correlations with respect to fifteen (15) different possible phases of CPICH correlations. These phases correspond to fifteen (15) different slots for a CPICH signal. There is no difference with respect to multipath location estimation by using P-SCH or CPICH. A shortcut is possible by estimating the peak locations in P-SCH processing, and then using SCAM to further associate the detected peaks to CPICH correlation for a particular monitored cell, given the list up to 32 scrambling codes. This process is repeated for each of the PSC correlation peaks calculated during the CS process. The hardware design ensures that there is enough bandwidth in hardware to perform the exhaustive search in the required time.

In order to monitor cells, the current CS approach covers blindly all possible cases. The power consumed by the CS is not negligible especially in IDLE mode. It is desirable to perform the CS and cell identification process with improved efficiency.

SUMMARY

The present invention is related to a method and apparatus for performing a power efficient cell search in a multi-cell wireless communication system. The method consists of selecting one peak and scanning through a list of cell IDs until the correlation value is above a well-chosen noise threshold. Then a second check is performed in order to determine whether more than one cell could have the same timing. If the ratio of the CPICH correlation value over the PSC correlation peak location is not greater than a factor F, then the search continues with the remaining cell IDs on the list until M cells are associated with the same PSC correlation peak location. This would indicate that there is another cell that has the same path location reported by P-SCH processing. The SCAM uses a limit of M cells associated with the same PSC correlation peak location. If the ratio of the CPICH correlation value over the PSC correlation peak location is greater that the factor F, the search with the current PSC correlation peak location is terminated and the process continues with the next PSC correlation peak location. The association process prioritizes the Cell ID(s) identified and ranked on the previous process.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

The present invention is related to a SCAM used to enhance the cell search process by reducing the time span required by a WTRU to perform a cell search. Therefore, the battery life of a WTRU is increased.

Figure 1:
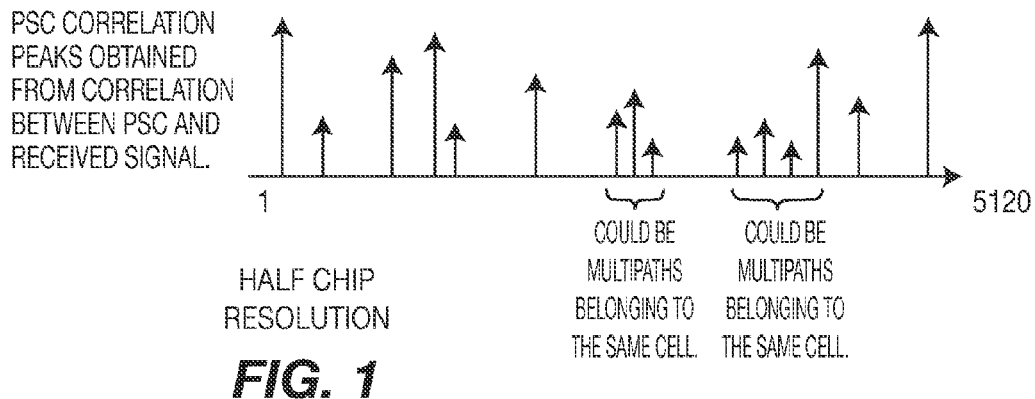
FIG. 1 shows an example of PSC correlation peaks over multiple time slots.

FIG. 1 shows an example of PSC correlation peaks obtained from correlation between a PSC and a received signal. The magnitude of the arrows shown in FIG. 1 indicates the correlation magnitude between the PSC and the I/Q baseband received signal. The positions of the arrows indicate a half-chip offset to the slot boundary belonging to different unknown cells. Adjacent arrows could be multipaths belonging to the same cell.

Figure 2:
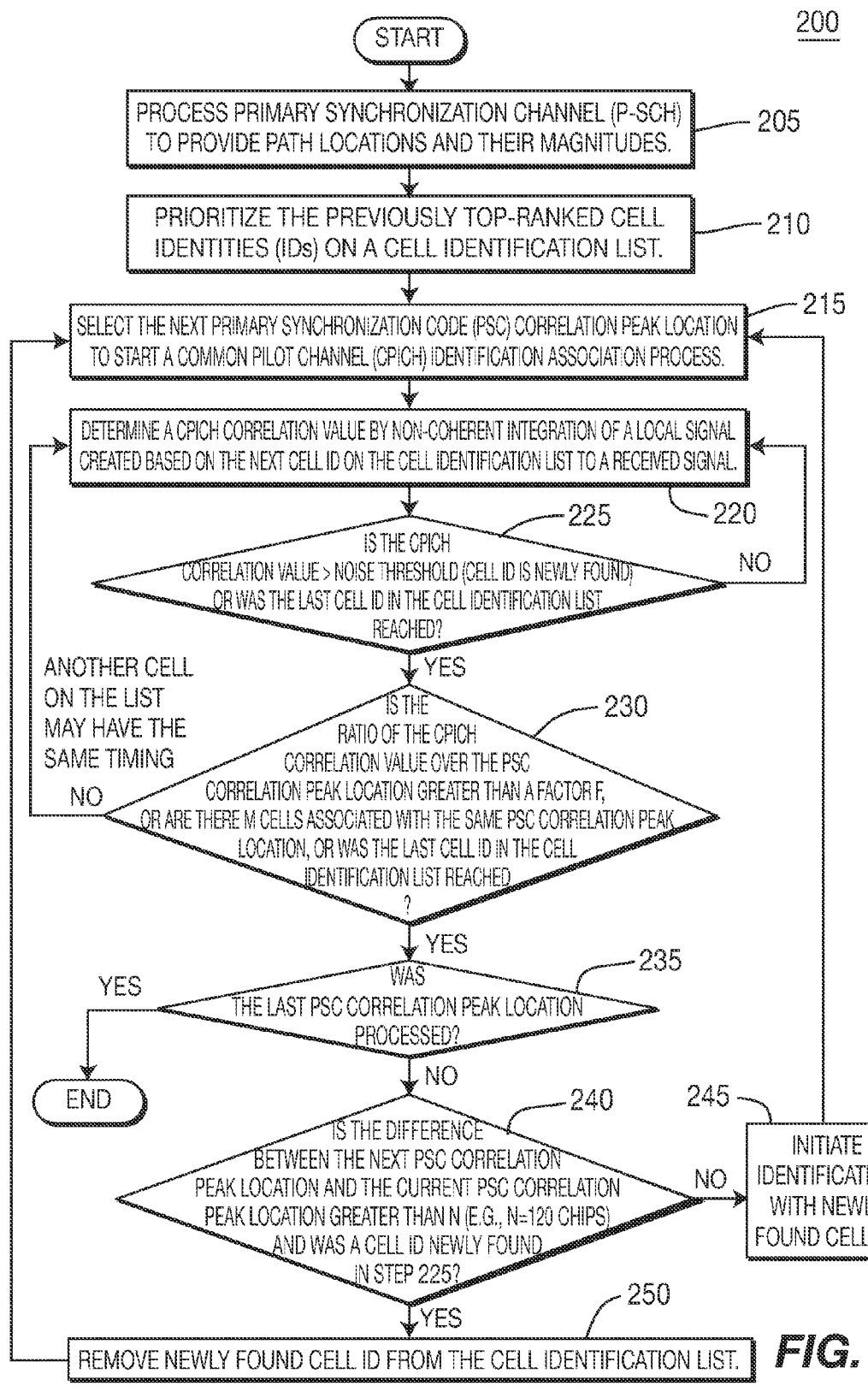
FIG. 2 shows a flow diagram of a SCAM algorithm in accordance with the present invention.

FIG. 2 is a flow diagram of a SCAM 200 implemented in a multi-cell wireless communication system in accordance with the present invention. In step 205, the P-SCH is processed to provide path locations and their magnitudes. In step 210, the previously top-ranked cell IDs on a cell identification list are prioritized. A list of neighbor cell IDs are passed from the network to the WTRU and stored in a memory within the WTRU. The prioritized list of the previously top-ranked cell IDs is a sub-set of the list of neighbor cell IDs and is also stored in the memory of the WTRU. In step 215, the next PSC correlation peak location is selected to start a CPICH identification association process. Steps 210 and 215 of the SCAM 200 are implemented to select a PSC correlation peak location and scan through a cell identification list of cell IDs until the correlation value is above a well-chosen noise threshold. The selection of the PSC correlation peak may be by order of highest to lowest peak values, lowest to highest peak values, or random.

Referring still to FIG. 2, a second check is performed in order to determine whether more than one cell on the list may have the same timing. In step 220, a CPICH correlation value is determined by non-coherent integration of a local signal created based on the next cell ID on the cell identification list to a received signal. This correlation value is obtained by correlating the CPICH and the I/Q baseband received signal. The I/Q baseband received signal is the signal that arrives at an antenna of the WTRU and is converted to baseband by a receiver front-end within the WTRU. In step 225, a determination is made as to whether the CPICH correlation value is greater that the noise threshold, (indicating that a cell ID is newly found), or whether the last cell ID in the cell identification list was reached. The comparison of the CPICH verification value with the noise threshold is used to associate, with high confidence, a cell ID with the current PSC correlation peak location with limited false alarm. The determination of whether the last cell ID on the cell identification list was reached is used to continue with next PSC correlation peak location when the last cell ID on the cell identification list has been reached.

Referring still to FIG. 2, in step 230, a determination is made as to whether: 1) the ratio of the CPICH correlation value over the PSC correlation peak location is greater than a factor F; or 2) there are M cells associated with the same PSC correlation peak location; or 3) the last cell ID in the cell identification list is reached. If at least one of the above conditions 1-3 is met, then step 235 will be executed.

Condition 1) is used to identify whether more than one cell may have the same path location. For 75 slots of P-SCH integration and 12 CPICH symbols integration, the value F has been computed empirically to be 7. For a different device or application that may use a different number of P-SCH slots and/or CPICH symbols, the factor F needs to be re-computed. If the ratio of the CPICH correlation value over the PSC correlation peak location is below or equal to a factor F, then the search continues with the remaining cell IDs on the cell identification list by repeating steps 220, 225 and 230 until M cells are associated with the same PSC correlation peak location, as specified by condition 2). This would indicate that there is another cell that has the same timing. Thus, the algorithm limits M cells to have the exact timing. Condition 3) is used to terminate the search for the current PSC peak location when the current cell ID is the last one in the cell identification list to be reached.

If one of the conditions 1-3 in step 230 is met, a determination of whether the last PSC correlation peak location was processed is made in step 235 and, if so, the SCAM 200 ends. If the last PSC correlation peak location was not processed, as determined in step 235, a determination as to whether the difference between the next PSC correlation peak location and the current PSC correlation peak location is greater that a predetermined value N, (e.g., N=120 chips which indicates a maximum possible channel delay spread), is performed at step 240. If the determination of step 240 is negative, identification with the newly found cell ID is initiated at step 245. In this case, the next PSC peak is identified as being a potential multipath of the newly found cell ID.

If none of the conditions 1-3 in step 230 is met, the search with the current PSC correlation peak location continues with the current PSC correlation peak location at step 220. If the next PSC correlation peak location is determined at step 240 to be within the next window of a 120 chip length, (this can be obtained by subtracting the location of the current PSC correlation peak from the location of the next PSC correlation peak), then the correlation process is initiated at step 235 with the same cell ID found previously. In the event that a cell ID is associated with the current PSC correlation peak location, but the next PSC correlation peak location is more than 120 chips from the current PSC correlation peak location, then this cell ID is removed from the cell identification list at step 240, (because it is too far to be a multipath belonging to the same cell).

The factor F can be easily derived from software simulations and can be selected in such way that no cells will be missed by the SCAM. By comparing the ratio of the CPICH correlation value over the PSC correlation peak location to a factor F, the SCAM 200 is able to detect and identify two or more cells that have the same timing, (e.g., a WTRU at a base station's cell boundary). Preferably, a limit of M cells is selected to have exactly the same timing. For example, M can be chosen to be two or three.

As an example of the SCAM 200 performed according to the method of FIG. 2, a CPICH correlation for cell search is performed over 12 symbols and a PSC correlation peak location is accumulated over 5 frames.

The CPICH correlators and the associated memory used in the hardware to perform cell identification consume a specific amount of power when running. In a realistic multipath environment, the average correlation time required to identify cells can be reduced by using the SCAM 200, thus reducing the power consumption. This can be easily attained by adding minimal control in software. In the worst case, the requirements will still be met but no energy will be saved.

Figure 3:
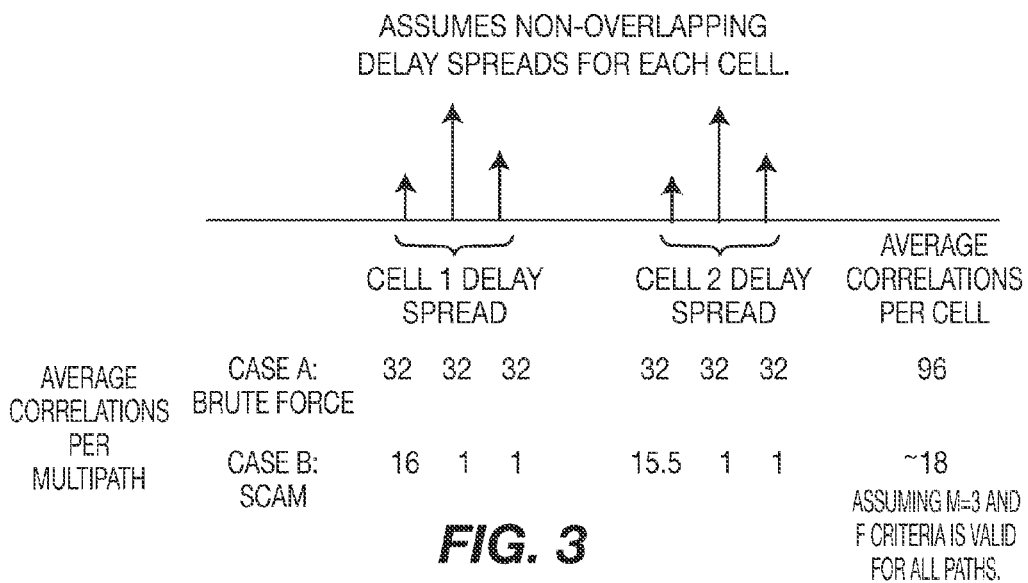
FIG. 3 shows an example of the performance gain achieved by the SCAM of FIG. 2 using sets of three multipaths per cell.

An example of the performance gain achieved by the SCAM 200 is illustrated in FIG. 3. This example uses sets of three multipaths per cell. The exhaustive search approach will always do CPICH correlation for each of the 32 cell IDs. The SCAM 200 stops correlating once a peak has passed a specified threshold. With uniform probability of finding any of the 32 cell IDs, the average number of correlation runs for the first multipath is 16. The codes for the following two multipaths of the same cell are found immediately from a single scrambling code correlation. The first path of the delay spread from the second cell is assumed to be found in the set of 31 cell IDs. Again with uniform probability of finding within the 31 cell IDs, the average number of correlation runs is 15.5. The average number of correlations for the following two paths is again one. This yields an approximate fractional energy requirement over the brute force approach of:

$$FractionalEnergy \approx \frac{1}{2 \cdot AvgNumMultipathsPerCell} \quad \text{Equation (1)}$$

In the case where only three multipaths per cell are present, the SCAM 200 reduces the power consumption by 5/6 for the CPICH identification portion of the CS design.

Figure 4:
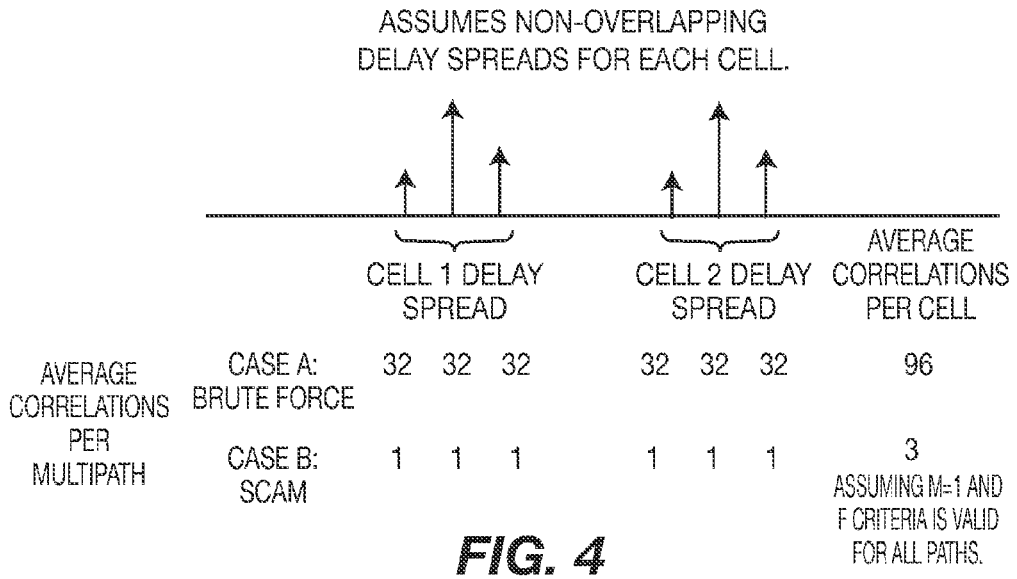
FIG. 4 shows an example of the performance gain achieved by the SCAM of FIG. 2 using one multipath per cell.

Another example of the performance gain achieved by the SCAM 200 is illustrated in FIG. 4. This example uses only one multipath per cell. Here, the advantage of the SCAM over a brute force approach is the difference between performing 3 average correlations per cell versus 96 correlations per cell.

Figure 5:
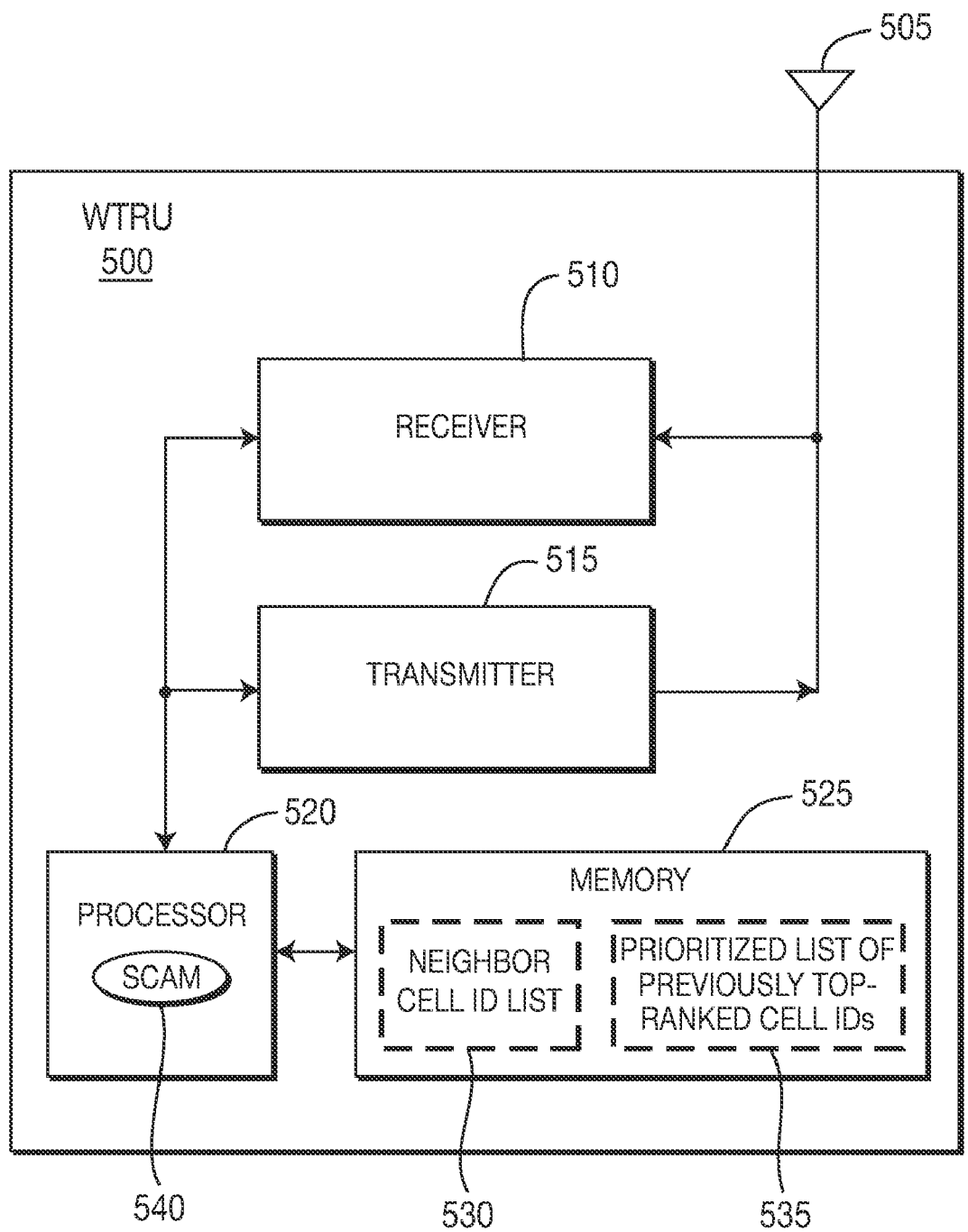
FIG. 5 is a block diagram of a WTRU that implements the SCAM of FIG. 2.

FIG. 5 is a block diagram of a WTRU 500 that implements the SCAM 200 in accordance with the present invention. The WTRU 500 includes an antenna 505, a receiver 510, a transmitter 515, a processor 520 and a memory 525. The memory stored a neighbor cell ID list 530 and a prioritized list of previously top-ranked cell IDs. The processor 520 executes a SCAM algorithm 540, which may be similar to the SCAM 200 of FIG. 2.

The present invention may be implemented, by way of example, in any wireless system, including a WCDMA or FDD based system. A particular implementation includes a processor, an application specific integrated circuit (ASIC), multiple integrated circuits, logical programmable gate array (LPGA), multiple LPGAs, discrete components, or a combination of integrated circuit(s), LPGA(s), and discrete component(s), or a digital signal processor (DSP), any of which may be used as part of a wireless transmit/receive unit (WTRU). A WTRU includes, but is not limited to a user equipment, mobile or fixed station, subscriber unit, pager, or any other type of device capable of operating in a wireless environment.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method of performing a cell search comprising:
storing a cell identification list of prioritized cell identities (IDs) in a memory;
converting the received signal to a baseband signal;
selecting a primary synchronization code (PSC) correlation peak location on the baseband signal;
determining a first common pilot channel (CPICH) correlation value by using non-coherent integration to correlate a first local signal, created based on a first cell identity (ID) on the cell identification list to the baseband signal;
determining whether the first CPICH correlation value is greater than a noise threshold, thus indicating that the first cell ID is a newly found cell ID, or whether a last cell ID in the cell identification list is reached;
on a condition that the first CPICH correlation value is determined not to be greater than the noise threshold, determining a second CPICH correlation value by using non-coherent integration to correlate a second local signal to the baseband signal, based on a second cell ID on the cell identification list; and
on a condition that the first CPICH correlation value is determined to be greater than the noise threshold or that the last cell ID on the cell identification list is reached, determining whether there is more than one cell ID on the cell identification list having the same timing.

2. The method of claim 1 wherein determining whether there is more than one cell ID on the list having the same timing comprises:
determining whether the ratio of the first CPICH correlation value over the PSC correlation peak location is greater than a factor F;
determining whether there are a predetermined number of cells associated with the same PSC correlation peak location;
determining whether the last cell ID in the cell identification list is reached.

3. The method of claim 2 wherein the determination of whether the ratio of the first CPICH correlation value over the PSC correlation peak location is greater than a factor F is used to identify whether more than one cell may have the same path location.

4. The method of claim 2 wherein for 75 slots of primary synchronization channel (P-SCH) integration and 12 CPICH symbols integration, the value of F is 7.

5. The method of claim 2 wherein on a condition that the ratio of the first CPICH correlation value over the PSC correlation peak location is below or equal to a factor F, continuing the cell search with the remaining cell IDs on the cell identification list.

6. The method of claim 2 further comprising:
ending the cell search on a condition that it is determined that a last PSC correlation peak location was processed; and
on a condition that the last PSC correlation peak location was not processed, determining whether the difference between the next PSC correlation peak location and the current PSC correlation peak location is greater than a predetermined value.

7. The method of claim 6 wherein the predetermined value is equal to 120 chips which indicates a maximum possible channel delay spread.

8. The method of claim 6 wherein on a condition that the difference between the next PSC correlation peak location and the current PSC correlation peak location is greater than a predetermined value, removing the newly found cell ID from the cell identification list.

9. The method of claim 8 wherein on a condition that the difference between the next PSC correlation peak location and the current PSC correlation peak location is not greater that the predetermined value, initiating identification with the newly found cell ID.

10. The method of claim 1 wherein the cell identification list has 32 cell IDs.

11. A wireless transmit/receive unit (WTRU) comprising:
an antenna configured to receive a signal;
a receiver in communication with the antenna, the receiver configured to convert the received signal to a baseband signal;
a memory configured to store a cell identification list of prioritized cell identities (IDs); and
a processor in communication with the receiver and the memory, wherein the processor is configured to perform a cell search wherein the processor:
selects a primary synchronization code (PSC) correlation peak location on the baseband signal;
determines a first common pilot channel (CPICH) correlation value by using non-coherent integration to correlate a first local signal, created based on a first cell ID on the cell identification list, to the baseband signal;
determines whether the first CPICH correlation value is greater than a noise threshold, thus indicating that the first cell ID is a newly found cell ID, or whether a last cell ID in the cell identification list is reached;
determines a second CPICH correlation value by using non-coherent integration to correlate a second local signal to the baseband signal, based on a second cell ID on the cell identification list, on a condition that the first CPICH correlation value is determined not to be greater than the noise threshold; and
determines whether there is more than one cell ID on the cell identification list having the same timing on a condition that the first CPICH correlation value is determined to be greater than the noise threshold or that the last cell ID on the cell identification list is reached.

12. The WTRU of claim 11 wherein the processor is configured to determine whether the ratio of the first CPICH correlation value over the PSC correlation peak location is greater than a factor F, or whether there are a predetermined number of cells associated with the same PSC correlation peak location, or whether the last cell ID in the cell identification list is reached.

13. The WTRU of claim 12 wherein the processor identifies whether more than one cell may have the same path location.

14. The WTRU of claim 12 wherein for 75 slots of primary synchronization channel (P-SCH) integration and 12 CPICH symbols integration, the value of F is 7.

15. The WTRU of claim 12 wherein on a condition that the ratio of the CPICH correlation value over the PSC correlation peak location is below or equal to a factor F, the processor is configured to perform the cell search with the remaining cell IDs on the cell identification list.

16. The WTRU of claim 12 wherein the cell search is terminated on a condition that the processor determines that a last PSC correlation peak location was processed.

17. The WTRU of claim 12 wherein on a condition that the last PSC correlation peak location was not processed, the processor determines whether the difference between the next PSC correlation peak location and the current PSC correlation peak location is greater that a predetermined value.

18. The WTRU of claim 17 wherein the predetermined value is equal to 120 chips which indicates a maximum possible channel delay spread.

19. The WTRU of claim 17 wherein on a condition that the difference between the next PSC correlation peak location and the current PSC correlation peak location is greater that a predetermined value, the processor is configured to remove the newly found cell ID from the cell identification list in the memory.

20. The WTRU of claim 19 wherein on a condition that the difference between the next PSC correlation peak location and the current PSC correlation peak location is not greater that the predetermined value, the processor initiates identification with the newly found cell ID.

21. The WTRU of claim 11 wherein the cell identification list has 32 cell IDs.

* * * * *